(12) United States Patent
Kumar et al.

(10) Patent No.: US 12,450,501 B2
(45) Date of Patent: Oct. 21, 2025

(54) DOMAIN-DRIVEN FEEDBACK DATA ANALYSIS IN INFORMATION PROCESSING SYSTEM

(71) Applicant: Dell Products L.P., Round Rock, TX (US)

(72) Inventors: Dhilip S. Kumar, Bangalore (IN); Sujit Kumar Sahoo, Bangalore (IN); Ajay Maikhuri, Bangalore (IN); Devaraj Marappa, Krishnagiri District (IN)

(73) Assignee: Dell Products L.P., Round Rock, TX (US)

( * ) Notice: Subject to any disclaimer, the term of this patent is extended or adjusted under 35 U.S.C. 154(b) by 739 days.

(21) Appl. No.: 17/870,942

(22) Filed: Jul. 22, 2022

(65) Prior Publication Data

US 2024/0028927 A1 Jan. 25, 2024

(51) Int. Cl.
- *G06N 5/04* (2023.01)
- *G06F 11/07* (2006.01)
- *G06F 40/30* (2020.01)

(52) U.S. Cl.
CPC ............ *G06N 5/04* (2013.01); *G06F 11/079* (2013.01); *G06F 40/30* (2020.01)

(58) Field of Classification Search
CPC ........ G06N 5/04; G06N 20/00; G06F 11/079; G06F 40/30; G06F 16/35
See application file for complete search history.

(56) References Cited

U.S. PATENT DOCUMENTS

| | | | | |
|---|---|---|---|---|
| 7,725,777 | B2 * | 5/2010 | Gehman | G06F 11/3495 714/26 |
| 11,544,588 | B2 * | 1/2023 | Baker | G06N 5/04 |
| 11,663,409 | B2 * | 5/2023 | Terry | G06F 16/34 706/12 |
| 11,949,645 | B2 * | 4/2024 | Martin | H04L 51/42 |
| 2016/0078367 | A1 * | 3/2016 | Adjaoute | G06F 16/215 706/12 |

OTHER PUBLICATIONS

C. Marshall, "What Is Intent Recognition and How Can I Use It?" https://medium.com/mysuperai/what-is-intent-recognition-and-how-can-i-use-it-9ceb35055c4f, Aug. 31, 2020, 5 pages.

(Continued)

*Primary Examiner* — Hassan Mrabi
(74) *Attorney, Agent, or Firm* — Ryan, Mason & Lewis, LLP

(57) ABSTRACT

Techniques are disclosed for domain-driven intent-based feedback data analysis. For example, a method comprises obtaining a feedback data set, and classifying the feedback data set into at least one domain of a plurality of domains. The feedback data set is mapped to a domain data set corresponding to the at least one domain, and a root cause is computed for the feedback data set to enable one or more actions to be taken in response to the feedback data set based on the root cause. By way of further example, computing the root cause for the feedback data set may further comprise utilizing at least one computed intent attribute, at least one computed sentiment attribute, and the domain data set to compute a decision on the root cause for the feedback data set.

20 Claims, 10 Drawing Sheets

(56) References Cited

OTHER PUBLICATIONS

Wikipedia, "Sentiment Analysis," https://en.wikipedia.org/w/index.php?title=Sentiment_analysis&oldid=1099109657, Jul. 19, 2022, 16 pages.
Wikipedia, "Speech Recognition," https://en.wikipedia.org/wiki/Speech_recognition, Jul. 5, 2022, 19 pages.
Wikipedia, "Random Forest," https://en.wikipedia.org/wiki/Random_forest, Jun. 20, 2022, 10 pages.
Wikipedia, "Bidirectional Recurrent Neural Networks," https://en.wikipedia.org/wiki/Bidirectional_recurrent_neural_networks, May 3, 2022, 2 pages.
Wikipedia, "Long Short-term Memory," https://en.wikipedia.org/wiki/Long_short-term_memory, Jul. 20, 2022, 10 pages.

* cited by examiner

DOMAIN-DRIVEN FEEDBACK DATA ANALYSIS IN INFORMATION PROCESSING SYSTEM

FIELD

The field relates generally to information processing systems, and more particularly to feedback data analysis in such information processing systems.

BACKGROUND

Many information processing systems associated with enterprises are configured to receive feedback data from entities (e.g., users) for the purpose of adapting the information processing systems and/or one or more other aspects of the enterprises. However, oftentimes, the feedback data is misdirected within an enterprise and/or misinterpreted by the enterprise. As a result, from the perspective of users who do not detect any adaptation in the information processing system and/or the enterprise itself, there is a feeling that the feedback data has been essentially ignored. This can have a significant negative impact on the information processing system and/or the enterprise.

SUMMARY

Embodiments provide techniques for domain-driven feedback data analysis.

For example, according to one illustrative embodiment, a method comprises obtaining a feedback data set, and classifying the feedback data set into at least one domain of a plurality of domains. The feedback data set is mapped to a domain data set corresponding to the at least one domain, and a root cause is computed for the feedback data set to enable one or more actions to be taken in response to the feedback data set based on the root cause.

In some illustrative embodiments, classifying the feedback data set into at least one domain of the plurality of domains may further comprise computing at least one intent attribute and at least one sentiment attribute from the feedback data set. Then, computing the root cause for the feedback data set may further comprise utilizing the at least one intent attribute, the at least one sentiment attribute, and the domain data set to compute a decision on the root cause for the feedback data set. In some illustrative embodiments, the method may further comprise causing the one or more actions to be taken in response to the feedback data set based on the root cause.

Further illustrative embodiments are provided in the form of a non-transitory computer-readable storage medium having embodied therein executable program code that when executed by a processor causes the processor to perform the above steps. Additional illustrative embodiments comprise an apparatus with a processor and a memory configured to perform the above steps.

Advantageously, illustrative embodiments obtain the feedback data set from a customer engaged with an enterprise through one or more transactions, and the plurality of classification domains comprise a plurality of supply-chain domains such that the computed root cause is used to enable one or more actions to be taken in a supply chain managed by the enterprise to address one of a customer intent and a customer sentiment extracted from the feedback data set.

These and other features and advantages of embodiments described herein will become more apparent from the accompanying drawings and the following detailed description.

DETAILED DESCRIPTION

Figure 1:
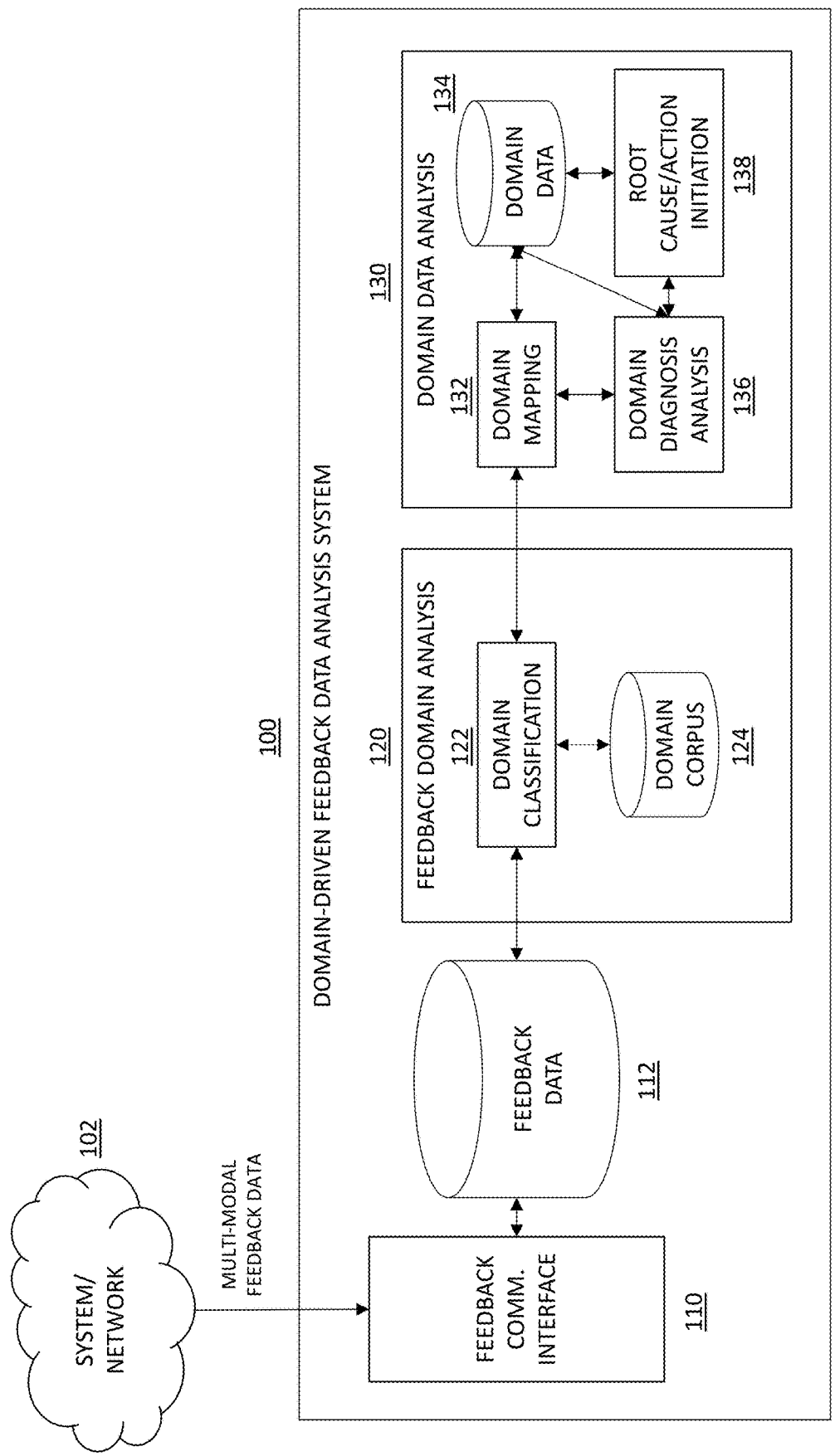
FIG. 1 illustrates a domain-driven feedback data analysis system according to an illustrative embodiment.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

As mentioned, many information processing systems associated with enterprises are configured to receive feedback data from entities (e.g., users) for the purpose of adapting the information processing systems and/or one or more other aspects of the enterprises. For example, assuming that the users are customers of a company, such as an original equipment manufacturer or OEM, studies have shown that a majority of people worldwide believe that companies need to take action on the feedback provided by customers. Studies have also shown that nearly all respondents say customer service is essential in their choice of loyalty to a product. Thus, obtaining customer feedback from consumers is paramount for a company or other enterprises. Most companies collect enormous amounts of feedback from their customers, but many do not use it effectively to improve their products and services. It has been shown that poor customer service experiences lead a majority of people to stop doing business with a company.

Poor customer service experience is one of the significant outcomes when customer feedback is not correctly analyzed.

The usefulness of feedback is not limited only to providing a better customer experience. It is also a great platform for a company to build a strong relationship with suppliers/vendors (and others in the product supply chain) and recommend to suppliers/vendors to improve their product quality, e.g., in terms of a better way to enhance the procurement experience. Still further, managing feedback can also improve performance of total availability market (TAM) analysis.

Feedback analysis is thus one of the most critical steps once a company has collected customer input, and can provide many benefits including, but not limited to: (i) improving a company's growth; (ii) building an optimal supply chain; (iii) providing insights to suppliers and vendors to improve their quality of products; (iv) improving part and sub-assembly consumption; (v) finding new and better suppliers; and (vi) changing the strategy to allocate rewards among suppliers.

Existing feedback analysis focuses on a general-purpose product rating and customer experience rating. In an organization, the knowledge acquired by specific domain expertise is immersive. For example, in the OEM context, domains such as order management, fulfilment, manufacturing, logistics, quality control, and procurement are the backbone of selling the product. Customer feedback applies to all these domains. Today, these domains are not directly analyzing the input in their domain context. Since customer feedback may be provided using an e-commerce website or other media, the organization's e-commerce team performs silo analysis. The e-commerce team then provides feedback to all domains. Since, for these domains, subject matter experts (SMEs) are not directly involved in the analysis, the feedback is not typically considered, prioritized, and observed within their respective domain context.

Often, organizational decisions depend on the SME. If the feedback analysis is not trained with the proper domain data, the purview of domain SMEs (e.g., data engineers, scientists, etc.) will lead to delayed action and unclear decisions. Thus, general-purpose feedback analysis fails to spot domain-related feedback and misinterprets the feedback since the analysis process is not trained in any domain-specific context.

Illustrative embodiments address the above and other technical issues by providing a domain-driven based feedback data analyzer system and process which, inter alia, intelligently assists, learns, and builds expertise by processing the feedback on the domain context.

Advantageously, in an OEM supply chain context by way of example only, a domain-driven feedback data analysis system according to one or more illustrative embodiments can identify the parts or sub-assembly and corresponding symptoms from feedback and proactively assist the respective domain professional to measure and optimize the components or sub-assemblies, behavior, quality, and price. More particularly, a domain-driven feedback data analysis process according to an illustrative embodiment is configured to apply a context that closely relates to a classified domain, for example: (i) a procurement domain applies parts or sub-assembly of the product performance; (ii) a manufacturing domain involves the parts or sub-assembly of the product behavior; (iii) a pricing domain applies product pricing related feedback; and (iv) a logistics domain uses product shipping related feedback.

Domain context analysis according to one or more illustrative embodiments connects respective domain data repositories and further analyzes and computes the root cause of an issue. Sentiment analysis according to one or more illustrative embodiments, including emotion recognition, can be used to find a part or sub-assembly performance or behavior. Intent analysis according to one or more illustrative embodiments is performed and leveraged from various feedback platforms such as, but not limited to, an e-commerce site, chat, and social media. Multi-modal (e.g., multiple data modalities and even multilingual data) communication, e.g., text to text, text to speech, and speech to text, are supported in one or more illustrative embodiments.

Referring initially to FIG. 1, a domain-driven feedback data analysis system 100 according to an illustrative embodiment is shown. As shown, domain-driven feedback data analysis system 100 receives data which can be in one or more modalities (multi-modal such as text data, speech data, video data, image data, etc.) from a system/network 102. The system/network 102 can be an e-commerce site, a computer-based supply chain system, or any other type of information processing system or network. The multi-modal feedback data represents the feedback data that is processed by domain-driven feedback data analysis system 100 to compute root causes of issues described or otherwise presented by the feedback data and to cause execution of one or more actions that address the root causes. Examples of multi-modal feedback data from system/network 102 will be further described herein.

As further shown, domain-driven feedback data analysis system 100 comprises a feedback communication (comm.) interface 110 which receives the feedback data from system/network 102 and converts the feedback data input from one or more given modalities (e.g., speech, video, image, etc.) into a feedback data in another given modality (e.g., text). The feedback data set is stored in feedback data store 112.

Domain-driven feedback data analysis system 100 further comprises a feedback domain analysis module 120 which, itself, comprises a domain classification module 122 and a domain corpus store 124. Domain classification module 122 and domain corpus store 124 are configured to classify a feedback data set, received from feedback data store 112, into a given domain of a plurality of domains. As will be further explained in detail herein, domain classification may comprise computation of one or more intent parameters and one or more sentiment parameters from the feedback data set. This intent and sentiment parameters enable domain classification module 122 to classify the feedback data set into one or more of the plurality of domains.

Still further, domain-driven feedback data analysis system 100 comprises a domain data analysis module 130 which, itself, comprises a domain mapping module 132, a domain data store 134, a domain diagnosis analysis module 136, and a root cause/action initiation module 138, operatively coupled as shown. Domain mapping module 132 maps the feedback data set to a domain data set from domain data store 134 corresponding to the given domain identified by domain classification module 122. Domain diagnosis analysis module 136 then computes a root cause for the feedback data set to enable one or more actions to be taken, in accordance with root cause/action initiation module 138, in response to the feedback data set based on the root cause. Domain data store 134 represents an intelligent domain data repository for data shared from other domains as well as learned from processing performed by domain-driven feedback data analysis system 100. More particularly, domain data store 134 is a knowledge repository and configured as an expert system learning over time in domain contexts.

Advantageously, unlike existing feedback analysis approaches, domain-driven feedback data analysis system 100 is not general-purpose with only generalized feedback data, but rather it is an intelligent domain-driven and domain-connected system configured and trained for the specific domains in a computing environment in which it is deployed, by way of example only, in a supply chain computing environment. This is achieved by initially configuring each domain with a domain-driven feedback data analysis system 100 and, over a given period of time, each domain-driven feedback data analysis system 100 accumulates expertise associated with every domain through the variety of feedback data received, as well as data shared by other domains.

Figure 2:
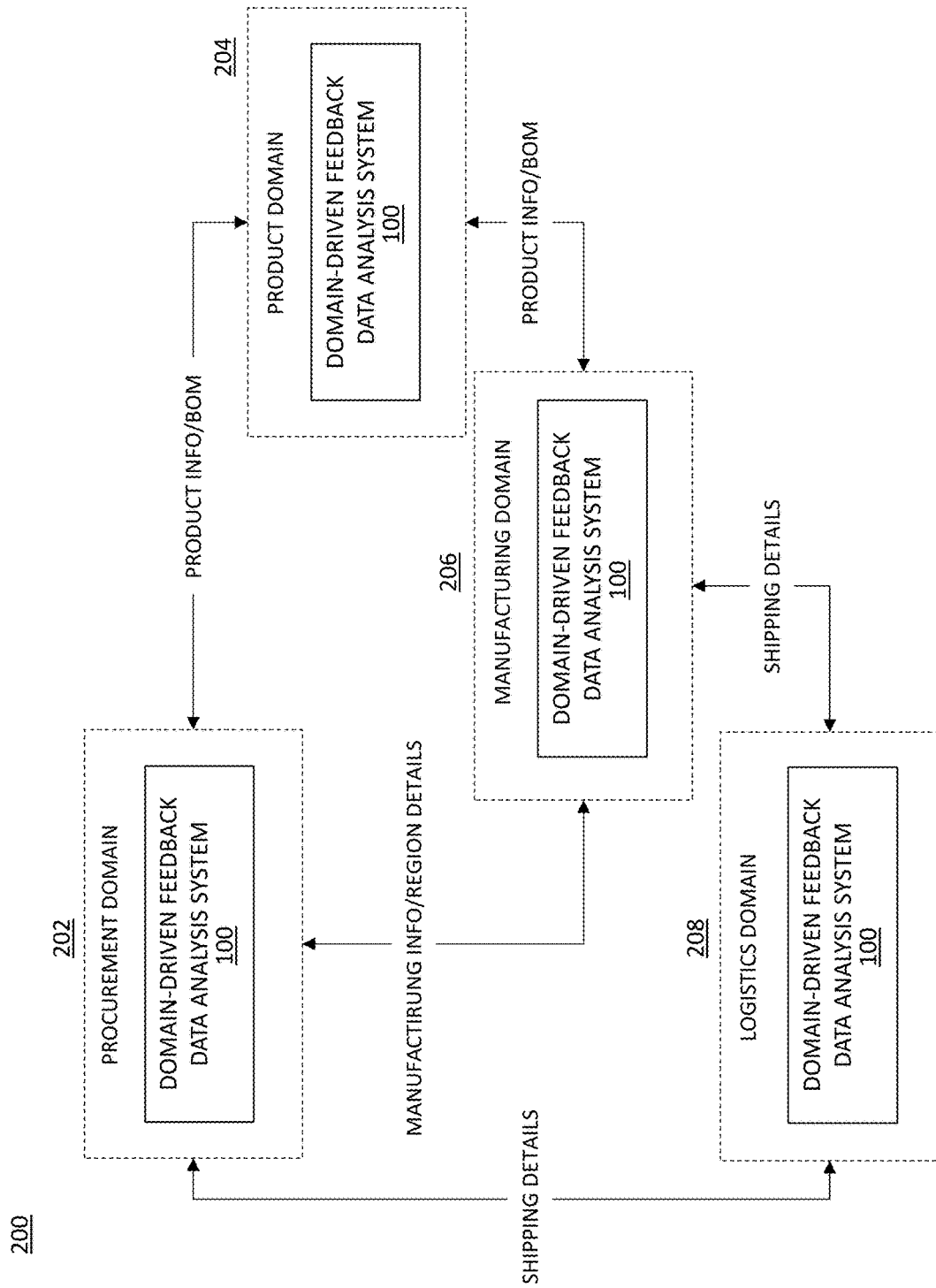
FIG. 2 illustrates an interconnected domain system with domain-driven feedback data analysis functionalities according to an illustrative embodiment.
Figure 3:
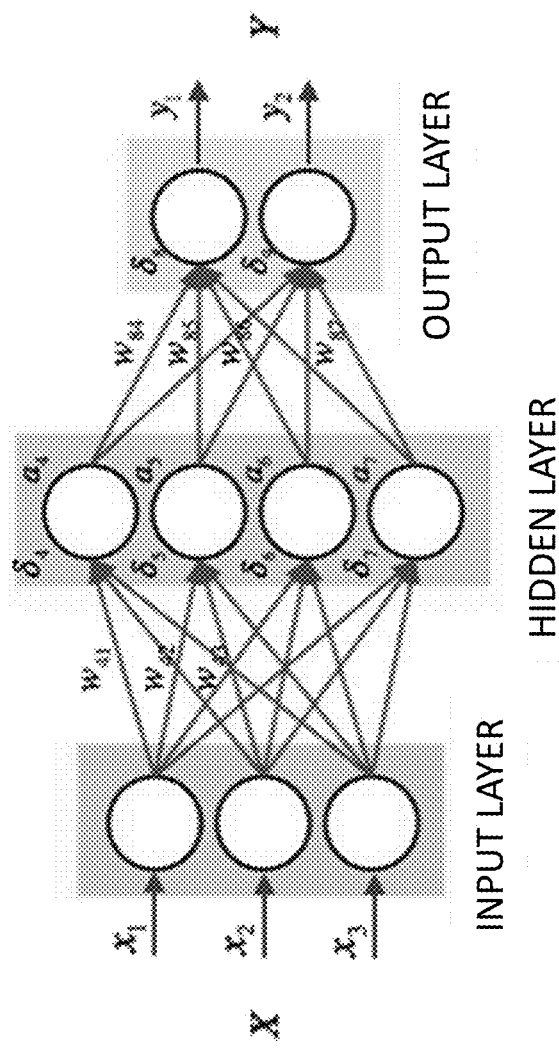
FIG. 3 illustrates a machine learning model used for intent classification according to an illustrative embodiment.

FIG. 2 illustrates an interconnected domain system 200 with domain-driven feedback data analysis functionalities according to an illustrative embodiment. As shown, a plurality of domains in a supply chain computing environment include a procurement domain 202, a product domain 204, a manufacturing domain 206, and a logistics domain 208. A supply chain computing environment comprises a network of processing devices that enable multiple parties in a manufacturing supply chain (e.g., manufacturers, suppliers, procurers, shippers, etc.) to communicate and/or manage their part of the supply chain that results in the manufacturing and delivery of some equipment or other product (e.g., software, hardware, etc.). Thus, domains 202 through 208 correspond to the multiple parties. Note that, in one or more illustrative embodiments, each of the plurality of domains comprises its own domain-driven feedback data analysis system 100 which performs domain data analysis with domain repositories/insights for the corresponding domain, as further explained herein.

Also, it is understood that there is collaboration and domain data sharing during the process between domain-driven feedback data analysis system 100 in each of the plurality of domains 202-208. For example, procurement domain 202 may obtain supporting domain information from product domain 204 (e.g., bill or material ort BOM), manufacturing domain 206 (e.g., product build details), and logistics domain 208 (e.g., route/country and other shipping details). Similarly, manufacturing domain 206 may receive supporting domain information from one or more of procurement domain 202, product domain 204, and logistics domain 208, and so on as illustrated. Thus, eventually, each domain-driven feedback data analysis system 100 within a given domain will be trained on domain data from every other domain, and can then respond to any type of feedback data it receives.

In general, domain-driven feedback data analysis reads and understands information and/or other communications from users (e.g., customers via system/network 102 in FIG. 1), which is then classified by domain and then analyzed against domain data in that classified domain so as to determine a root cause and one or more actions to be taken. Assume by way of example only that customer feedback to a laptop manufacturer, in accordance with a customer review function (transaction) within an e-commerce system, comprises the following:

"Device is lightweight and fine for light productivity use, school work, etc., but can occasionally slows with heavy to mid-heavy workloads. The CPU is the limiting factor understandably. The operating system is responsive and frequently updated. Screen is very good but some improvement could be made for movies and photo viewing, such as increased contrast and color depth. WiFi stability is decent but could be improved."

With reference back to FIG. 1, assume the above customer laptop review is received as a speech signal by feedback communication interface 110 of domain-driven feedback data analysis system 100 which is deployed by the laptop OEM and it is assumed that domain-driven feedback data analysis system 100 is already trained to manage feedback data for each domain. As will be explained further below, the speech signal is converted into text by feedback communication interface 110 and stored in feedback data store 112 for access by feedback domain analysis module 120. Feedback domain analysis module 120 extracts intent and/or sentiment from the feedback data set to determine one or more domain classifications for the feedback data set. Thus, using the example customer review above, assume that feedback domain analysis module 120 identifies the following classifications: a procurement domain due to some of the CPU performance and display feedback; a manufacturing domain due to some of the CPU performance, display, and operating system feedback; and a product domain due to some of the CPU performance and display feedback.

These classification results are then provided to domain data analysis module 130. Domain data analysis module 130 maps the various classifications to domain-specific data (e.g., domain data store 134) for each domain. Thus, continuing with the example customer review, domain data analysis module 130 identifies data in the procurement domain relating to the supplier of the CPU sub-assembly and the supplier of the display. Similarly, for the manufacturing domain, domain data analysis module 130 identifies data relating to CPU contract manufacturer log analysis. Still further, for the product domain, domain data analysis module 130 identifies data relating to laptop and CPU sub-assembly and burn log analysis. Domain data analysis module 130 then uses the domain-specific data to diagnose (e.g., domain diagnosis analysis module 136) one or more issues (root causes) related to the feedback data set, and identifies one or more actions to be taken to remedy the issues in the supply chain. For example, actions can be initiated in the various domains to improve laptop display and/or CPU sub-assemblies, improve early anomaly detection, and increase CPU chip performance. This may involve, by way of example only, domain data analysis module 130 (e.g., root cause/action initiation module 138) generating and transmitting one or more messages across the supply chain computing network to parties and/or systems that can affect the prescribed actions.

Accordingly, illustrative embodiments implement functionalities in domain-driven feedback data analysis system 100 to understand the feedback in a domain context using natural language processing (NLP) and sentiment analysis, and by building a domain expertise repository, i.e., domain-specific data/domain data store 134, for each domain. Feedback communication interface 110 receives the feedback information in one or more data modalities such as in text, video, or audio formats. It is to be appreciated that feedback communication interface 110 is configured to perform audio classification, speech recognition, and/or speech synthesis. Feedback domain analysis module 120 is configured to perform text analysis including entity recognition, intent, sentiment, and content classifications, as well as video processing for facial sentiment analysis and building one or more facial expression recognition models.

An NLP interpreter can be implemented in one or more illustrative embodiments to interpret the language into a specific vocabulary, correct misspellings, implement word synonyms, decode complicated abbreviations, etc., as well as identifying specified restrictions and grammar cloning, rule filtering, searching, grammar pruning, processing, and restriction filtering.

In some illustrative embodiments, audio/video activity detection processing can be implemented to identify and segregate voices from an input data signal. Further, speech signal processing can be performed to detect emotions of the speakers involved in the feedback conversation.

Additionally, in some illustrative embodiments, image expression analysis (e.g., emoji, image, logo) is used along with image detection, dimension reduction, and normalization. Feature extraction from a facial image and highlighting by classification (e.g., emotions, etc.) can also be implemented in the system.

Advantageously, illustrative embodiments provide domain-driven feedback data analysis with machine learning-based models and algorithms configured to learn the domain context in order to build a domain expertise corpus. More particularly, the analysis identifies specific domains related to feedback using artificial neural networks (ANNs) to learn from situations. ANNs are used to recognize and classify. Domain diagnosis analysis then detects the root cause using historical specific domain data.

Furthermore, illustrative embodiments provide a feedback analysis approach which trains the analyzer individually to support a specific domain. This is achieved by implementing functionality to build a knowledge repository as an expert system by learning over time in a domain context. This repository recommends the decisions regarding feedback and actions in that specific domain.

Still further, illustrative embodiments provide an interconnected domain computing environment. One domain is interconnected with other dependent domains for data. This interconnectedness brings insights into other domains' decisions and actions to improve their findings and root causes. This ensemble approach can dynamically switch the context to all connected domains on an as-needed basis.

Further details of the various functionalities described above will be explained herein below in the context of FIGS. 3-10.

As mentioned, feedback domain analysis module 120 of domain-driven feedback data analysis system 100 is configured to analyze the context of feedback data and utilize a domain corpus to classify the feedback data into one or more domains. Feedback domain analysis module 120 uses NLP and neural networks to analyze the feedback data set and determine the intent.

Assuming that the feedback data set is similar to a time series model where the words come one after another in time/space, illustrative embodiments leverage a recurrent neural network (RNN). To better understand the context and analyze the feedback data set most efficiently, illustrative embodiments use a bi-directional RNN, which uses two separate processing sequences, one from left to right and another from right to left. As RNNs have the tendencies to explode or vanish with respect to gradient issues for longer and complex dialogs/messages, illustrative embodiments leverage a specific type of bi-directional RNN called a bi-directional RNN with LSTM (long short-term memory) for the NLP.

RNNs are a unique type of neural network where the previous step's output feeds into the current step's input. In a traditional neural network, which is also called a feed-forward network, input and output are independent. In language processing, it is important to remember the previous words before predicting the next term of a sentence. This is where an RNN makes a difference by having the hidden state recognize some phrases in the sentence. If the sentences are too long, some of that previous information may not be available in the limited hidden state, which requires the bi-directional processing of the sentence (from past and future in two sequences in a parallel manner) as provided by a bi-directional RNN. LSTM introduces advanced memory units and gates to an RNN to improve the model's accuracy and performance. A diagram of a bi-LSTM network with input, hidden, and output layers is shown as a machine learning model 300 in FIG. 3.

Figure 4:
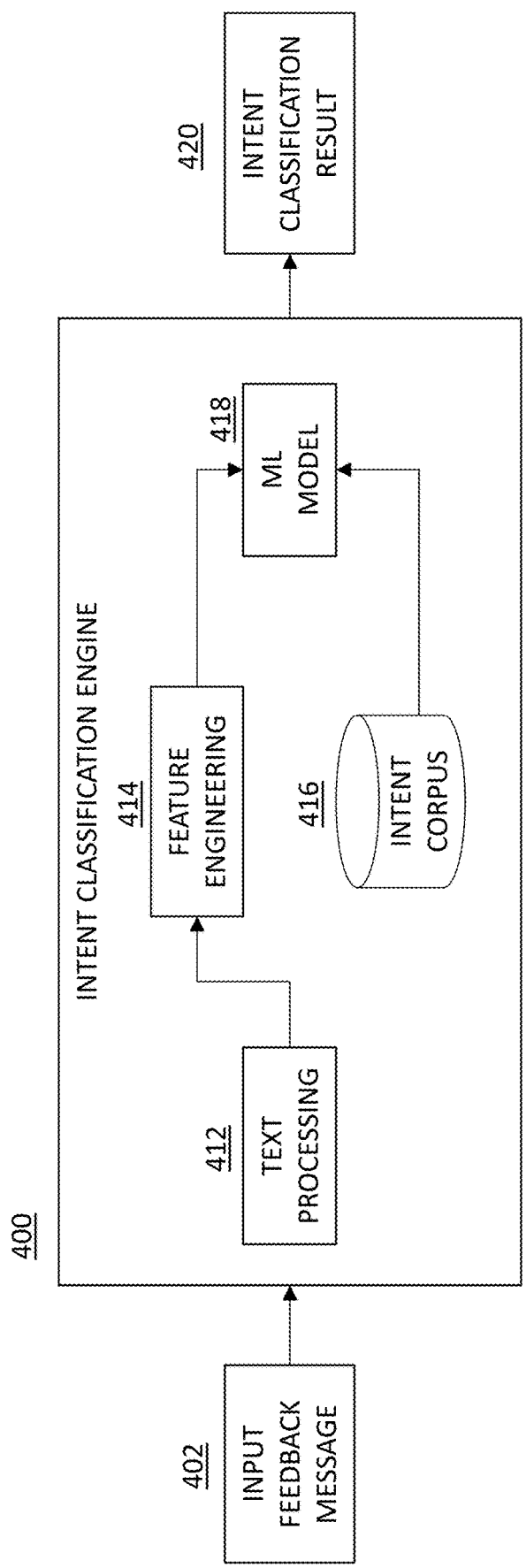
FIG. 4 illustrates an intent classification engine according to an illustrative embodiment.

FIG. 4 illustrates an intent classification engine 400 according to an illustrative embodiment. Intent classification engine 400 can be part of domain classification module 122 in feedback domain analysis module 120 of domain-driven feedback data analysis system 100. As shown, an input feedback message 402 (feedback data set) is input to a text processing module 412 which is operatively coupled to a feature engineering module 414. Feature engineering module 414 and an intent corpus 416 are operatively coupled to a machine learning (ML) model 418. ML model 418, in one or more illustrative embodiments, comprises the bi-LSTM network of machine learning model 300 in FIG. 3. The output of intent classification engine 400 is intent classification results 420.

The intent analysis starts with a set of corpus data (e.g., intent corpus 416) used to train the ML model 418. This corpus data contains the words and phrases and the intent associated with each sentence. First, the input feedback message 402 is pre-processed (e.g., text processing module 412) to clean any unwanted characters and stop words. This step may also include stemming and lemmatization, changing text to lowercase, removing punctuation, removing flawed characters, etc.

Once pre-processing and data cleanup is executed, the input list of words (in the sentences from the input feedback message 402) is tokenized. This is performed in feature engineering module 414. There are many approaches to tokenizing these words including, but not limited to, Keras library, NLTK library, etc. In one illustrative embodiment, a Keras tokenizer class is used to index the tokens. After tokenization is executed, they are padded to make them of equal length to be used in ML model 418.

For output encoding, the same is done (tokenization and padding) to the intent list of the corpus. At the end of this step, the intent list is indexed and ready to be fed into ML model 418. First, they need to be one-hot encoded before being provided to ML model 418.

As mentioned, the corpus containing intent data (416) is used to train ML model 418 before predicting the intent for incoming dialog. The bi-directional RNN model with LSTM (418) is created using the Keras library. Several parameters are passed during the creation of the model, including an Adam optimizer, an activation function such as Softmax, number of epochs, etc. These parameters, especially batch size and periods, are tuned to obtain the best performance and accuracy of the model. After the model is trained with the intent training data, it can predict the dialog message's intent (420). The accuracy of the model is calculated as well for hyperparameter tuning.

Figure 5:
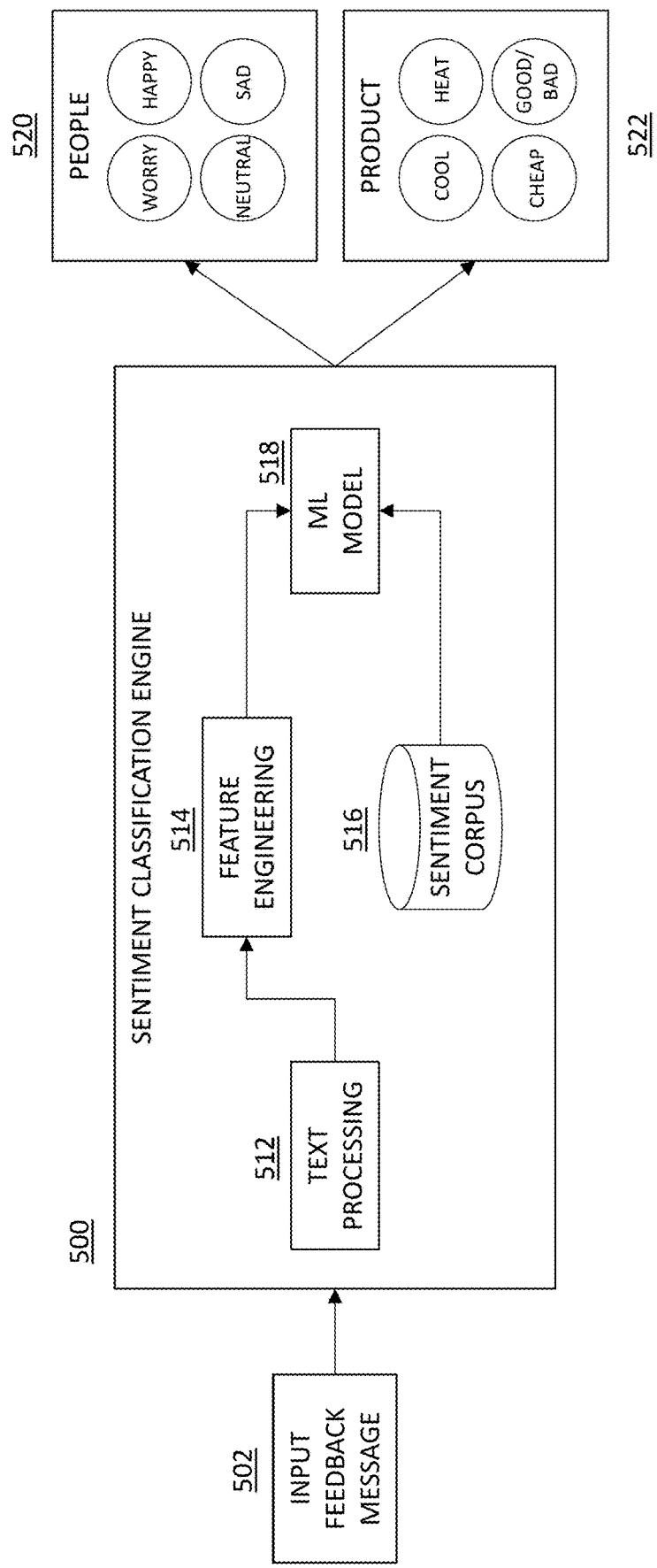
FIG. 5 illustrates a sentiment classification engine according to an illustrative embodiment.
Figure 6:
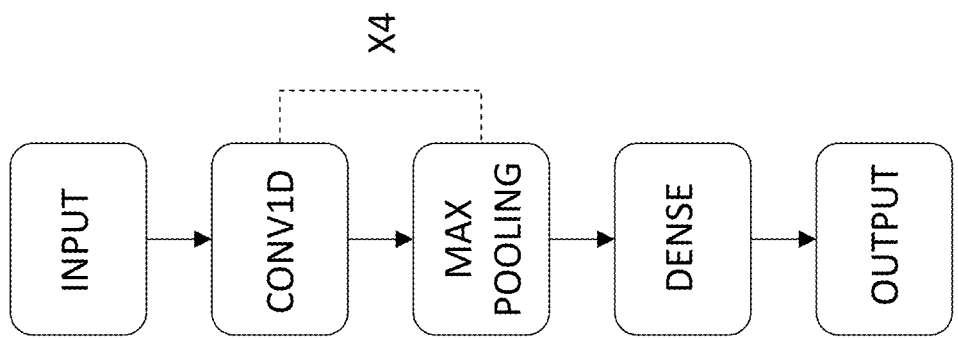
FIG. 6 illustrates a machine learning model used for input data modality conversion according to an illustrative embodiment.

FIG. 5 illustrates a sentiment classification engine 500 according to an illustrative embodiment. Sentiment classification engine 500 can be part of domain classification module 122 in feedback domain analysis module 120 of domain-driven feedback data analysis system 100. As shown, input feedback message 502 (the same input feedback message 402 provided to intent classification engine 400 of FIG. 4) is input to a text processing module 512 which is operatively coupled to a feature engineering module 514. Feature engineering module 514 and a sentiment corpus 516 are operatively coupled to a machine learning (ML) model 518. ML model 518, in one or more illustrative embodiments, is the same bi-LSTM network used by ML model 418 of intent classification engine 400. The output of sentiment classification engine 500 is sentiment attributes 520 (related to people such as worry, happy, neutral, sad, etc.) and sentiment attributes 522 (related to products such as cool, heat, cheap, good/bad, etc.).

Sentiment analysis performed by sentiment classification engine 500 comprises understanding the feedback context and making appropriate decisions in a priority manner. The sentiment analysis follows the same pattern and algorithms as the intent analysis of intent classification engine 400, using a sentiment corpus (516) instead of an intent corpus. More particularly, the same pre-processing done in text processing module 412 is done in text processing module 512, and the same feature engineering done in feature engineering module 414 is done in feature engineering module 514, before training the same bi-LSTM network (ML model 418/518) for predicting the sentiment. As shown, there are two types of sentiment attributes identified, i.e., sentiment attributes 520 for how customers feel about a product, and sentiment attributes 522 for the product itself (e.g., for each item/part that made the feedback comments).

Recall that the feedback communication interface 110 of domain-driven feedback data analysis system 100 is the primary interface layer for communication with external system/network 102. Any inbound or outbound communication involving all types of messages by email, voice, and chat passes through feedback communication interface 110 before/after being processed.

In one illustrative embodiment, feedback communication interface 110 utilizes speech to text conversation. Messages received as audio/voice signals are converted to text before being analyzed for intent, sentiment, and contexts to make the root cause decisions and thus determine the most appropriate actions. This requires a speech to text model to convert a voice message to a text format. Illustrative embodiments assume that voice messages are received in digital signal format. If they are in analog format, sampling the signal includes converting it into a digital format. The sampling rate or sampling frequency is defined as the number of samples selected per second. The first step in speech recognition is to extract features from the voice signal, which will be input into the model later. There are multiple approaches to feature extraction including, but not limited to, time-domain analysis and frequency domain analysis. In the time-domain analysis, the voice signal is represented by the amplitude as a function of time, so essentially a plot between amplitude and time. In frequency domain analysis, it is a plot between frequency and amplitude. To represent features between frequency and time, a spectrograph can be plotted.

In some illustrative embodiments, TensorFlow is used which provides a speech command dataset that includes thousands of people's one-second long utterances of many words. This data set is used as training data for the created speech to text model. LibROSA and SciPy libraries can be used for audio processing in Python. Illustrative embodiments use neural networks for feature learning and prediction of audio to text. The speech-to-text model can use a one-dimension convolutional neural network called Conv1d, available in TensorFlow and Keras. In this neural network model, illustrated as a machine learning model 600 in FIG. 6, there are four layers of Conv1d, and maximum (max) pooling is used.

Figure 7:
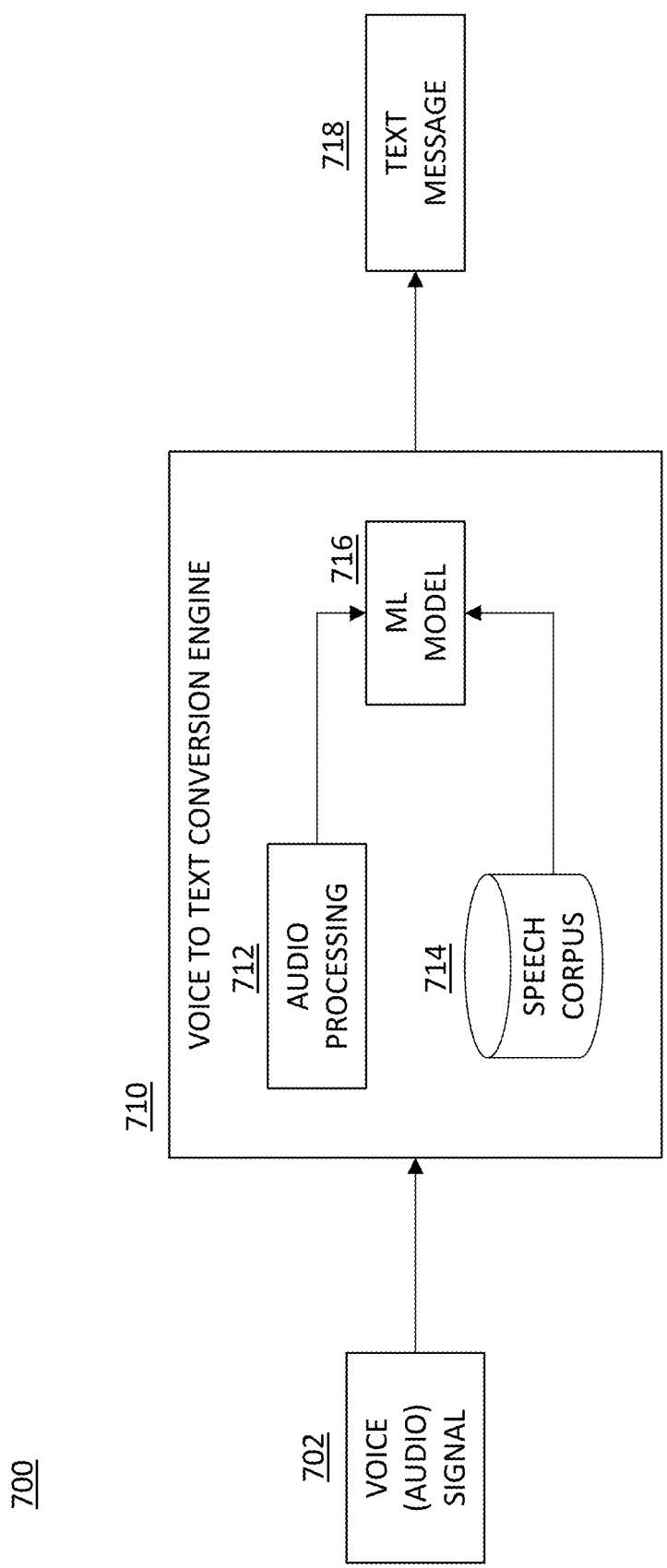
FIG. 7 illustrates a voice to text conversion engine according to an illustrative embodiment.

FIG. 7 illustrates a voice to text conversion engine 700 according to an illustrative embodiment. Voice to text conversion engine 700 can be implemented in feedback communication interface 110 in one or more illustrative embodiments. As shown, voice to text conversion engine 700 comprises an audio processing module 712, a speech corpus 714, and an ML model 716.

A voice (audio) signal 702 is received and pre-processed by audio processing module 712 by sampling (if needed) and removing any speech less than a given duration (e.g., one second). The sampled voice data is applied to the ML model 716, which is trained as follows. In a multi-classification use case, target value labels (which are categorical data) are encoded by a label encoder (e.g., classes available in the ScikitLearn library). Audio sample data from speech corpus 714 is broken into training (about 80%) and testing (about 20%) sets. ML model 716 is trained with the training data set. When ML model 716 is the machine learning model 600 shown in FIG. 6, the four convolutional layers use ReLu (rectifier linear unit) as the activation function, and the output layer uses Softmax as the activation function. Categorical cross-entropy is used as the loss function (error or the difference between the predicted value and actual value) and an Adam optimizer can be used by ML model 716. ML model 716 then outputs a text message 718 which represents the decoded voice signal 702. The text message 718 is the feedback data set that is processed by the rest of domain-driven feedback data analysis system 100.

Figure 8:
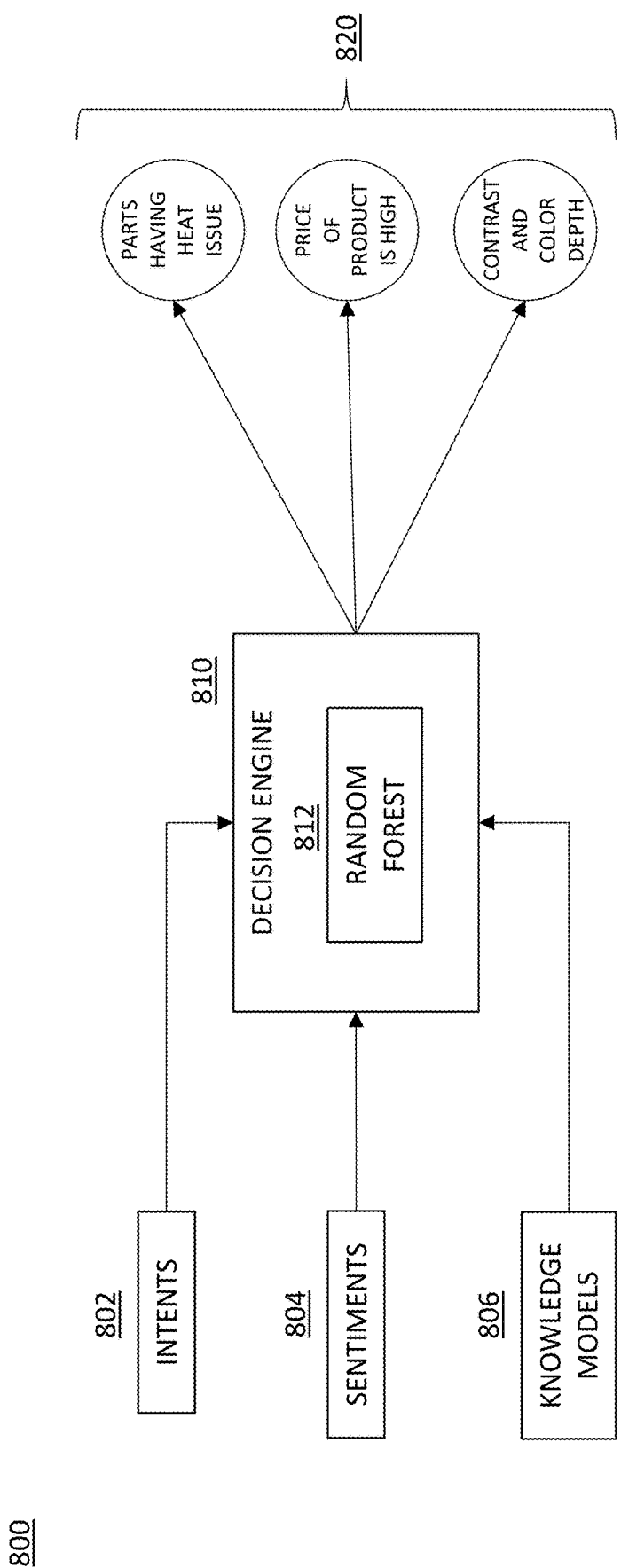
FIG. 8 illustrates a feedback data analysis decision engine according to an illustrative embodiment.

Turning now to FIG. 8, a feedback data analysis decision engine 800 according to an illustrative embodiment is shown. Feedback data analysis decision engine 800 can be part of domain diagnosis analysis module 136 of domain data analysis module 130. More particularly, as shown, a decision engine 810 implements a random forest model 812 (e.g., a supervised machine learning algorithm) and receives, as input, one or more intent attributes 802 and one or more sentiment attributes 804 identified from the feedback data set, as well as one or more knowledge models 806 which represent the domain knowledge learned and stored in domain data store 134. Decision engine 810 then computes different root causes and actions 820 based on the one or more intent attributes 802, the one or more sentiment attributes 804, and the one or more knowledge models 806.

More particularly, feedback data analysis decision engine 800 is responsible for deciding domain-related action from feedback. Decision engine 810 leverages an ensemble, decision tree-based bagging technique referred to as a random forest for multinomial classification of actions. The random forest model 812 uses historical training data containing multi-dimension data points for training. Once the random forest model 812 is fully trained, the conversation's (feedback data set's) state (i.e., intent, sentiment, and context) is used to predict an optimal or near optimal decision. Random forest model 812 uses a large group of complex decision trees and can provide classification predictions with a high degree of accuracy on any size of data. Decision engine 810 can predict the recommended virtual assistant with the accuracy or likelihood percentage. The accuracy of the random forest model 812 can be improved by hyperparameter tuning.

Figure 9:
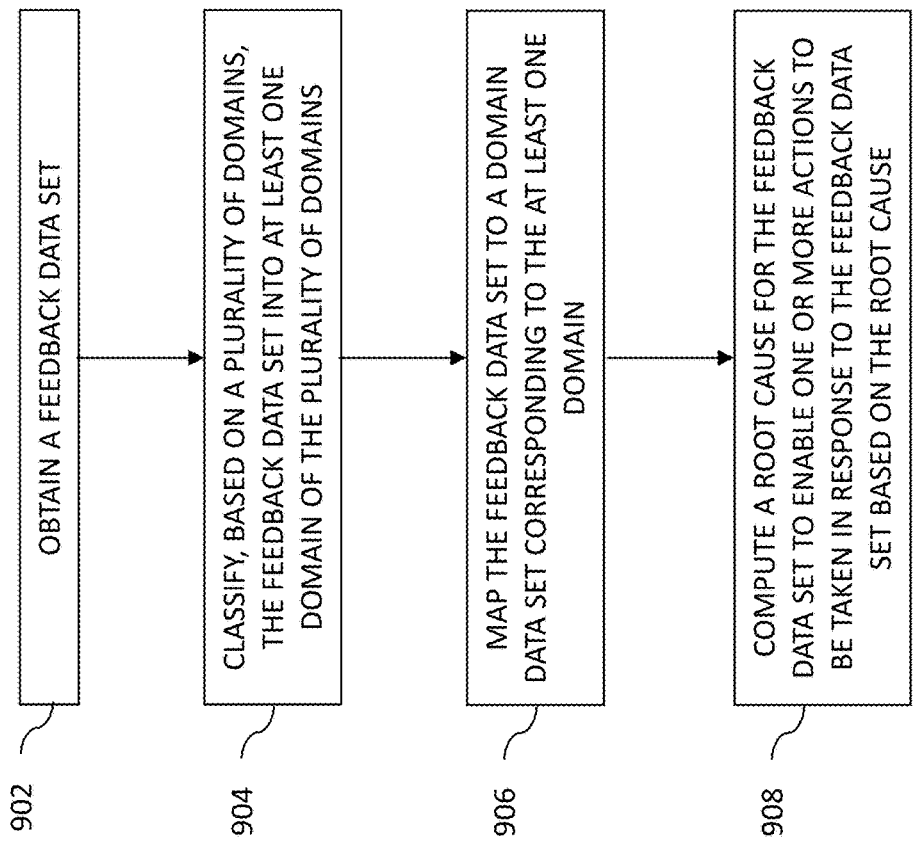
FIG. 9 illustrates a methodology for domain-driven feedback data analysis according to an illustrative embodiment.

FIG. 9 illustrates a methodology 900 for domain-driven feedback data analysis according to an illustrative embodiment. Step 902 obtains a feedback data set. Step 904 classifies the feedback data set into at least one domain of a plurality of domains. Step 906 maps the feedback data set to a domain data set corresponding to the at least one domain. Step 908 computes a root cause for the feedback data set to enable one or more actions to be taken in response to the feedback data set based on the root cause. By way of further example, computing the root cause for the feedback data set may further comprise utilizing at least one computed intent attribute, at least one computed sentiment attribute, and the domain data set to compute a decision on the root cause for the feedback data set. Further, the feedback data set may be obtained from an entity engaged with an enterprise through one or more transactions, and the plurality of domains comprise a plurality of domains associated with the one or more transactions. For example, as illustrated herein, when the plurality of domains relate to a supply chain, transactions may comprise interactions or experiences a customer has had with different domains in the supply chain (e.g., purchasing experience, shipping experience, product performance experience, customer support experience, etc.).

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud infrastructure can include private clouds, public clouds, and/or combinations of private/public clouds (hybrid clouds).

Figure 10:
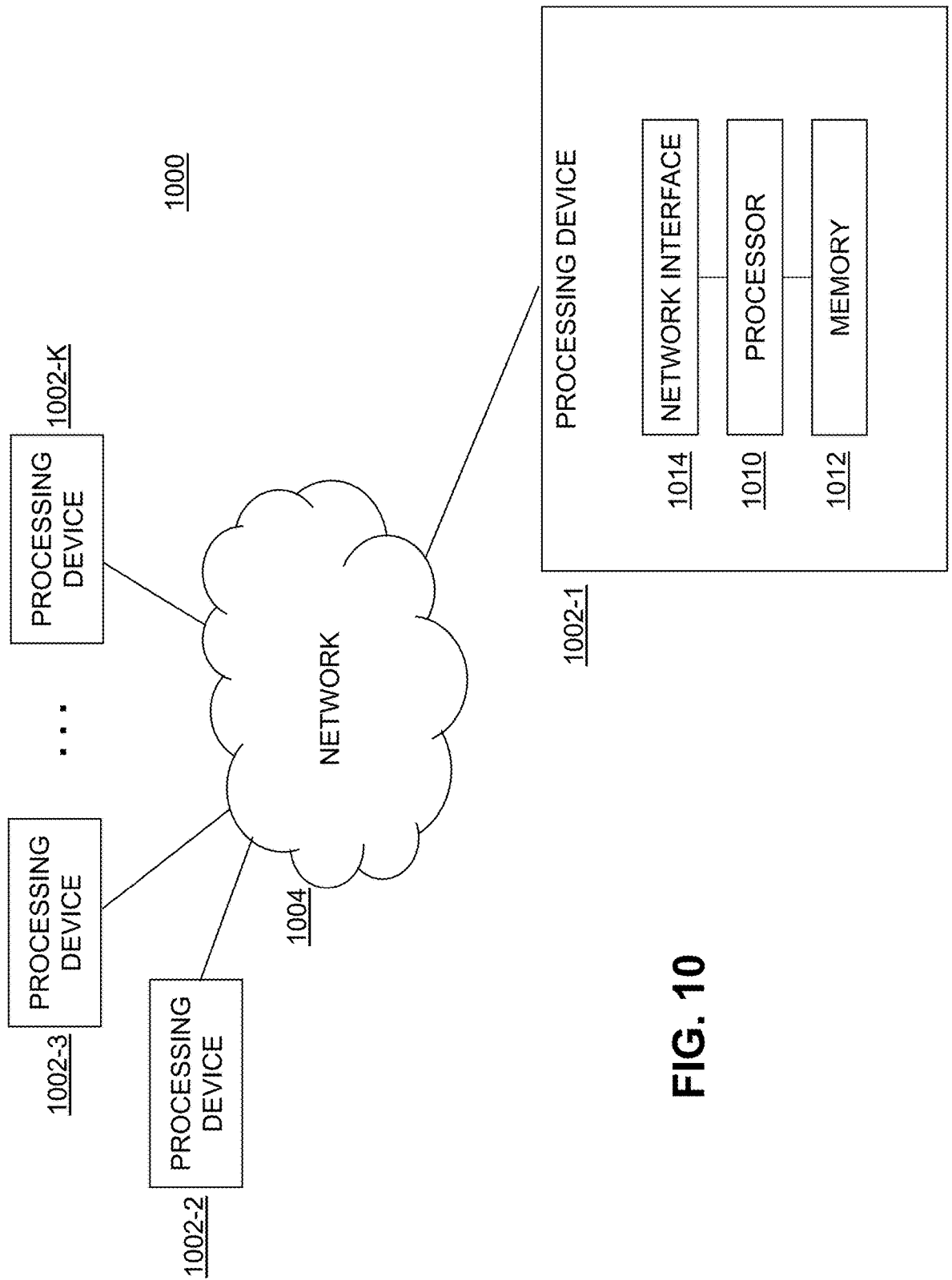
FIG. 10 illustrates a processing platform for an information processing system used to implement a domain-driven feedback data analysis according to an illustrative embodiment.

FIG. 10 illustrates a processing platform 1000 used to implement architectures/systems/processes/data 100 through 900 depicted in FIGS. 1 through 9 respectively, according to an illustrative embodiment. More particularly, processing platform 1000 is a processing platform on which a computing environment with functionalities described herein can be implemented.

The processing platform 1000 in this embodiment comprises a plurality of processing devices, denoted 1002-1, 1002-2, 1002-3, . . . 1002-K, which communicate with one another over network(s) 1004. It is to be appreciated that the methodologies described herein may be executed in one such processing device 1002, or executed in a distributed manner across two or more such processing devices 1002. It is to be further appreciated that a server, a client device, a computing device or any other processing platform element may be viewed as an example of what is more generally referred to herein as a "processing device." As illustrated in FIG. 10, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1002 shown in FIG. 10. The network(s) 1004 represent one or more communications networks that enable components to communicate and to transfer data therebetween, as well as to perform other functionalities described herein.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random-access memory (RAM), read-only memory (ROM) or other types of memory, in any combination. The one or more software programs when executed by a processing device such as the processing device 1002-1 causes the device to perform functions associated with one or more of the components/steps of system/methodologies in FIGS. 1 through 9. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the networks 1004 and other system components. Such circuitry may comprise conventional transceivers of a type well known in the art.

The other processing devices 1002 (1002-2, 1002-3, . . . 1002-K) of the processing platform 1000 are assumed to be configured in a manner similar to that shown for computing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the system shown as 1000 in FIG. 10 may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

Furthermore, it is to be appreciated that the processing platform 1000 of FIG. 10 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1000 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-10 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus, comprising:
a processing platform comprising at least one processor and at least one memory storing computer program instructions wherein, when the at least one processor executes the computer program instructions, the apparatus is configured to:
obtain a feedback data set;
classify, based on a plurality of domains, the feedback data set into at least one domain of the plurality of domains;
map the feedback data set to a domain data set corresponding to the at least one domain; and
compute a root cause for the feedback data set to enable one or more actions to be taken in response to the feedback data set based on the root cause.

2. The apparatus of claim 1, wherein obtaining the feedback data set further comprises obtaining the feedback data set from an entity engaged with an enterprise through one or more transactions, and the plurality of domains comprise a plurality of domains associated with the one or more transactions.

3. The apparatus of claim 2, wherein obtaining the feedback data set further comprises converting input from the entity in one or more modalities into the feedback data set.

4. The apparatus of claim 1, wherein classifying the feedback data set into at least one domain of the plurality of domains further comprises computing at least one intent attribute from the feedback data set.

5. The apparatus of claim 4, wherein computing the at least one intent attribute from the feedback data set further comprises utilizing a machine learning model in the computation.

6. The apparatus of claim 1, wherein classifying the feedback data set into at least one domain of the plurality of domains further comprises computing at least one sentiment attribute from the feedback data set.

7. The apparatus of claim 6, wherein computing the at least one sentiment attribute from the feedback data set further comprises utilizing a machine learning model in the computation.

8. The apparatus of claim 1, wherein computing the root cause for the feedback data set further comprises utilizing at least one intent attribute, at least one sentiment attribute, and the domain data set to compute a decision on the root cause for the feedback data set.

9. The apparatus of claim 8, wherein computing the decision on the root cause for the feedback data set further comprises utilizing a supervised machine learning algorithm in the computation.

10. The apparatus of claim 1, wherein when the at least one processor executes the computer program instructions, the apparatus is further configured to cause the one or more actions to be taken in response to the feedback data set based on the root cause.

11. The apparatus of claim 1, wherein when the at least one processor executes the computer program instructions, the apparatus is further configured to learn over time at least a portion of the domain data set corresponding to the at least one domain.

12. The apparatus of claim 1, wherein obtaining the feedback data set further comprises obtaining the feedback data set from a customer engaged with an enterprise through one or more transactions, and the plurality of domains comprise a plurality of supply-chain domains such that the computed root cause is used to enable one or more actions to be taken in a supply chain managed by the enterprise to address one of a customer intent and a customer sentiment extracted from the feedback data set.

13. A method, comprising:
obtaining a feedback data set;
classifying, based on a plurality of domains, the feedback data set into at least one domain of the plurality of domains;
mapping the feedback data set to a domain data set corresponding to the at least one domain; and
computing a root cause for the feedback data set to enable one or more actions to be taken in response to the feedback data set based on the root cause;

wherein the steps are performed by a processing platform comprising at least one processor coupled to at least one memory executing program code.

14. The method of claim 13, wherein obtaining the feedback data set further comprises obtaining the feedback data set from an entity engaged with an enterprise through one or more transactions, and the plurality of domains comprise a plurality of domains associated with the one or more transactions.

15. The method of claim 13, wherein classifying the feedback data set into at least one domain of the plurality of domains further comprises computing one or more of:
   at least one intent attribute from the feedback data set; and
   at least one sentiment attribute from the feedback data set.

16. The method of claim 13, wherein computing the root cause for the feedback data set further comprises utilizing at least one intent attribute, at least one sentiment attribute, and the domain data set to compute a decision on the root cause for the feedback data set.

17. The method of claim 13, further comprising causing the one or more actions to be taken in response to the feedback data set based on the root cause.

18. A computer program product stored on a non-transitory computer-readable medium and comprising machine executable instructions, the machine executable instructions, when executed, causing a processing device to perform steps of:
   obtaining a feedback data set;
   classifying, based on a plurality of domains, the feedback data set into at least one domain of the plurality of domains;
   mapping the feedback data set to a domain data set corresponding to the at least one domain; and
   computing a root cause for the feedback data set to enable one or more actions to be taken in response to the feedback data set based on the root cause.

19. The computer program product of claim 18, wherein classifying the feedback data set into at least one domain of the plurality of domains further comprises computing at least one intent attribute from the feedback data set, and computing at least one sentiment attribute from the feedback data set, and further wherein computing the root cause for the feedback data set further comprises utilizing the at least one intent attribute, the at least one sentiment attribute, and the domain data set to compute a decision on the root cause for the feedback data set.

20. The computer program product of claim 19, further comprising causing the one or more actions to be taken in response to the feedback data set based on the root cause.

* * * * *